April 10, 1962  H. M. WALKER  3,029,049
DECELERATION GEAR
Filed Nov. 16, 1959
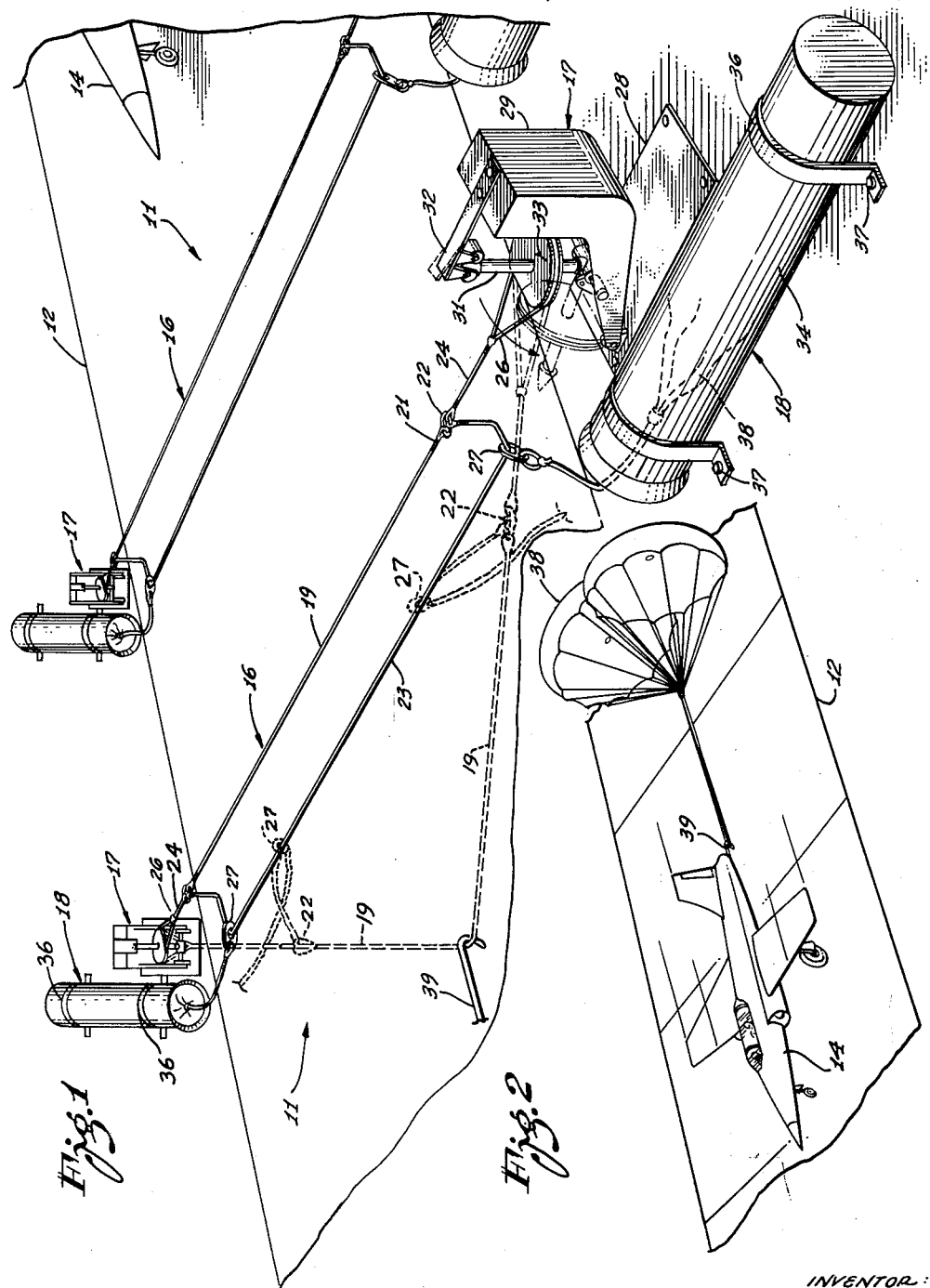
INVENTOR:
Howard Melville Walker

3,029,049
DECELERATION GEAR
Howard Melville Walker, Torrance, Calif., assignor to Northrop Corporation, Beverly Hills, Calif., a corporation of California
Filed Nov. 16, 1959, Ser. No. 853,248
4 Claims. (Cl. 244—110)

This invention pertains to decelerating gear and more particularly to land based gear for decelerating the speed of an aircraft during a landing operation.

Numerous systems for arresting or decelerating the velocity of a landing aircraft have been proposed. These systems have proven beneficial and have unquestionably prevented the loss of many aircraft and personnel. However, prior art systems have not been utilized to the extent warranted because of their initial and installation costs, complexity, lack of mobility, maintenance, etc.

Briefly, the present arresting gear utilizes one or more drag chutes for decelerating an aircraft. The chute or chutes are land based and are attached to a loop-like cable assembly one run of which is horizontally suspended at a predetermined distance above and across a runway by means of stanchions or the like. Parachute deployment is accomplished by the aircraft to be decelerated engaging a suspended run of the arresting cable. Upon engagement of the suspended run of the arresting cable, and a predetermined force is applied thereto by the arresting aircraft, the cable is disengaged from the stanchions. Parachute attachment means allows the chute or chutes to slide along the arresting cable to the apex point of the cable thus providing a stabilized center-line deceleration.

Accordingly, an object of the present invention is to provide efficient land based arresting gear for aircraft and the like.

Another object is to provide land based arresting gear for aircraft and the like which is easily installed requiring a minimum of preparation and installation time.

Another object is to provide land based arresting gear for aircraft and the like including a minimum of components and, therefore, can be easily transported by air.

Another object is to provide land based arresting gear for aircraft and the like which requires a minimum of maintenance.

Another object is to provide land based arresting gear for aircraft and the like which is simple in design yet rugged in construction, economical to manufacture and has a low operating cost.

Although the characteristic features of the present invention are particularly pointed out in the appended claims, the invention itself, also the manner in which it may be carried out, will be better understood by referring to the following description taken in connection with the accompanying drawing forming a part of this application and in which:

FIGURE 1 is a perspective view of a multiple installation of the aircraft arresting gear as disclosed herein.

FIGURE 2 is a perspective view showing an aircraft utilizing the arresting gear of FIGURE 1.

Referring now to the drawing and particularly FIGURE 1, here the arresting gear assembly as disclosed herein is indicated in its entirety by the numeral 11. Also shown in this figure and in FIGURE 2 is a landing surface or strip 12 on which an aircraft 14 is landing. The arresting gear 11 includes an arresting cable assembly 16, a pair of stanchions or support members 17, and parachute receiving container assemblies 18.

The cable assembly 16 includes a steel or non-elastic cable 19 having a length approximately equal to the width of the landing strip 12. The cable 19 has eye shaped terminal ends 21 each of which carries a ring member 22. The assembly 16 also includes a resilient cable 23 the length of which exceeds the width of the landing strip 12. The cable 23 also carries eye members at its ends and provides means for attaching the cable 23 to the rings 22. So assembled the cables 19 and 23 provide a continuous loop a portion of which is resilient and a portion of which is non-elastic.

The assembly 16 also includes a pair of elastic cable members 24. Corresponding ends of the members 24 are attached to the rings 22, as by eye members or like means, while their other ends constitute loops 26 of predetermined size adapted to serve a purpose to be explained presently. Construction of the assembly 16 is completed by a pair of parachute attachment rollers or slide members 27 which are slideably mounted on the cable 23.

Each of the support members 17 includes a base plate 28, an L-shaped tension member 29, a spindle member 31 and detent means 32. The tension member 29 is mounted on the base plate for pivotal movement about a horizontal axis while the spindle member 31 is mounted on the member 29, also for pivotal movement about a horizontal axis, substantially as shown in FIGURE 1. The spindle member 31 carries a sheave-like member 33 fixedly secured thereto at approximately its midpoint. The spindle is normally held in a vertical position by the detent means 32.

The parachute receiving container assemblies 18 constitute a cylindrical container 34 securable to the ground by a pair of bands 36 and pins 37 which pass through apertures provided in the end of the bands. A parachute 38 is adapted to be stored in each of the containers 34 in a longitudinally stretched out position as shown in FIGURE 1. The shroud lines of the parachutes are attached to the aforementioned slides 27.

The installation of the arresting gear 11 is effected by anchoring the support members 17 on directly opposite sides of an aircraft landing surface, for example on opposite sides of the landing strip 12. The support members are spaced apart a distance equal to the combined length of the non-elastic cable 19 and the two elastic cables 24. The loops 26 are positioned in surrounding relation on the sheave-like members 33 and the spindles 31 are then secured in a near vertical position by means of the detent means 32. So rigged the cables 19 and 24 are held taut, due to the force of gravity acting on the L-shaped members 29, and at a predetermined distance (approximately six (6) inches) above the surface of the landing strip 12. The resilient cable 23 being of greater length than the non-resilient cable 19 will be in contact with the surface of the landing strip and may be arranged substantially as shown in FIGURE 1. The parachutes 38 are stowed in the aforementioned longitudinal stretched out position by means of a static line (not shown) provided inside the containers 34.

Parachute deployment is accomplished by the arresting aircraft 14 engaging the elevated run 19. In the embodiment shown this is accomplished by means of a hook-like member 39 located at the aft end of the aircraft 14; however, this contact may be effected with any type of barrier means, for example wing or landing gear engagement.

Upon the application of a horizontal force of predetermined magnitude the spindles 31 are released from their detent means 32 and pivot to a substantially horizontal position substantially as shown in dotted line construction in FIGURE 1. This pivotal movement of the spindles 31 frees the loops 26 from the sheave-like members 33, the cable assembly 16 now being free to travel with the aircraft 14.

The chutes are almost simultaneously pulled from the containers 34 and the slide members 27 allow them to slide along the resilient cable 23 to the apex point or trailing end of the cable substantially as shown in FIGURE 2. A pressurized air-filled doughnut (not shown) located on the leading edge of the parachute skirts may be employed if desired to insure positive parachute billowing.

Should the intervals between landing be relatively short a plurality of arresting gear assemblies 16 may be installed along the landing strip 12 substantially as shown in FIGURE 1. In such an installation the arresting cables 19, that is all except the one which is to be utilized first, are released from the members 17 which automatically lowers the cable 19 into a non-operating position in which the latter will be in contact with the surface of the landing strip 12. After the first assembly 11 is utilized subsequent arresting assemblies may be activated as required by field personnel.

Thus it will be seen that aircraft arresting gear is provided which fulfills the various objects of the invention.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Deceleration gear for aircraft and the like comprising: a length of non-elastic cable; corresponding ends of a pair of elastic cables being attached to the respective ends of said non-elastic cable; a length of resilient cable of greater length than the length of said non-elastic cable; the ends of said resilient cable being secured to the ends of said non-elastic cable whereby the latter and resilient cables provide a closed loop; a pair of elongated support members having cable attaching ends and ground attaching ends; releasable means securing the other ends of said elastic cables to said pair of support members whereby said non-elastic and elastic cables are horizontally positioned a predetermined distance above the surface of an aircraft landing strip and at least a major portion of said resilient cable contacts the surface of said landing strip at such time as the ground attaching ends of said support members are affixed to said landing strip; at least one parachute; and means for slideably securing the shroud lines of said parachute to said resilient cable.

2. Deceleration gear for aircraft and the like comprising: a length of non-elastic cable; corresponding ends of a pair of elastic cables being respectively attached to each end of said non-elastic cable; a length of resilient cable of greater length than the length of said non-elastic cable; the ends of said resilient cable being secured to the ends of said non-elastic cable whereby the latter and said resilient cable form a closed loop; a pair of elongated support members having cable attaching ends and ground attaching ends; releasable means securing the other ends of said elastic cables to said pair of support members whereby said non-elastic and elastic cables are horizontally positioned a predetermined distance above the landing surface on which an aircraft to be decelerated may land and at least a major portion of said resilient cable contacts the landing surface at such time as the ground attaching ends are affixed to the ground adjacent said landing surface; at least one parachute; at least one cylindrical container adapted to be positioned adjacent the landing surface; and means for slideably securing the shroud lines of said parachute, at such times as the parachute is stored in said container in a longitudinal stretched out position, to said resilient cable.

3. Deceleration gear for aircraft and the like as set forth in claim 2: further characterized in that said deceleration gear includes at least a pair of parachutes and at least a pair of containers; said parachutes being respectively stored in said containers in a longitudinal stretched out position and said containers being respectively mounted on each side of said landing surface; and means for independently slideably securing the shroud lines of each of said parachutes to said resilient cable.

4. Deceleration gear for aircraft and the like as set forth in claim 3: further characterized in that said releasable means includes detent means adapted to release said elastic cables at such times as a force of predetermined magnitude is applied in a horizontal direction to said non-elastic and elastic cables.

References Cited in the file of this patent

UNITED STATES PATENTS

| | | |
|---|---|---|
| 2,443,308 | Doolittle | June 15, 1948 |
| 2,465,936 | Schultz | Mar. 29, 1949 |
| 2,729,409 | Hand | Jan. 3, 1956 |